US012130173B2

(12) United States Patent
Lee et al.

(10) Patent No.: US 12,130,173 B2
(45) Date of Patent: Oct. 29, 2024

(54) OPTICAL FIBER SENSING SYSTEM

(71) Applicant: National Applied Research Laboratories, Taipei (TW)

(72) Inventors: Zheng-Kuan Lee, Taipei (TW); Shyh-Bin Chiou, Taipei (TW)

(73) Assignee: NATIONAL APPLIED RESEARCH LABORATORIES, Taipei (TW)

(*) Notice: Subject to any disclaimer, the term of this patent is extended or adjusted under 35 U.S.C. 154(b) by 303 days.

(21) Appl. No.: 17/709,375

(22) Filed: Mar. 30, 2022

(65) Prior Publication Data
US 2023/0184583 A1    Jun. 15, 2023

(30) Foreign Application Priority Data

Dec. 15, 2021  (TW) .................... 110147069

(51) Int. Cl.
G01H 9/00 (2006.01)
G01H 3/00 (2006.01)
(52) U.S. Cl.
CPC .............. G01H 9/004 (2013.01); G01H 3/00 (2013.01)
(58) Field of Classification Search
CPC .. G01H 9/004; G01H 3/00; G01C 9/14; F16F 2224/0266; F16F 2234/02; F16F 7/112; F16F 7/104
See application file for complete search history.

(56) References Cited

U.S. PATENT DOCUMENTS 9,995,579 B2    6/2018  Boudin
10,495,532 B2 *  12/2019  Lee .................. G01C 9/22

FOREIGN PATENT DOCUMENTS

| CN | 102607523 A | 7/2012 |
| CN | 203285428 U | 11/2013 |
| CN | 106948256 A | 7/2017 |
| TW | M628508 | 6/2018 |
| TW | 201915439 A | 4/2019 |

* cited by examiner

*Primary Examiner* — John Bedtelyon
(74) *Attorney, Agent, or Firm* — MUNCY, GEISSLER, OLDS & LOWE, P.C.

(57) ABSTRACT

The optical fiber sensing system is provided. The optical fiber sensing system comprises an optical fiber measuring module, a floating module, and a containing structure. The floating module disposed in the containing structure has a plurality of floating units. Each floating unit has a mass element and a vibration absorbing structure. It is adapted to apply appropriate tensile force to the optical fiber measuring module by adjusting counterweight of the quality bodies. The vibrating influence to the optical fiber measuring system would be reduced through the vibration absorbing structure.

11 Claims, 12 Drawing Sheets

OPTICAL FIBER SENSING SYSTEM

CROSS REFERENCE TO RELATED APPLICATION

This application claims the benefits of the Taiwan Patent Application Serial Number 110147069, filed on Dec. 15, 2021, which is incorporated herein by reference.

BACKGROUND OF THE INVENTION

1. Field of the Invention

The present invention relates to an optical fiber sensing system, more particularly, to an optical fiber sensing system with a vibration absorbing structure and a floating structure with adjustable density.

2. Description of Related Art

Conventional optical fiber sensors are widely built around structures (such as bridges, roads, and railroad tracks) to monitor the inclination or subsidence of structures or ground, thereby facilitates real-time grasp and ensures the safety of environment and structures. In detail, the conventional optical fiber sensor has an optical fiber measuring unit, a floating element and a fluid, the optical fiber measuring unit is connected to the floating element, the floating element generates tensile force on the optical fiber measuring unit, and the fluid provides buoyant force on the floating element. When the structure or the ground slopes or sinks, the buoyant force will correspondingly changes, and the tensile force applied to the optical fiber measuring unit will also change accordingly. In this situation, the output signal fluctuates, so that the critical situation can be grasped immediately for repairing structures immediately.

However, the disadvantage of the conventional optical fiber sensor is that the density of the floating element is often much greater than a density of the fluid, and the material of the optical fiber measuring unit itself is fragile and damageable. The optical fiber measuring unit is pulled by the floating element whose density is much greater than that of the fluid for a long time, so it is prone to fatigue and breakage and needs to be replaced frequently.

Furthermore, conventional optical fiber sensors are usually installed on structures such as bridges, roads, or railways. The large transportations will cause the structures to vibrate violently, thereby causing the conventional optical fiber sensors to vibrate violently as well. Under the circumstances that the structures do not equip with any shock absorbing structure, the conventional optical fiber sensor is easily damaged by severe shaking.

In addition, a plurality of conventional optical fiber sensors are generally arranged on the structure in a manner of being spaced apart from each other to monitor the status of each section of the structure. However, every two conventional optical fiber sensors shares one optical fiber with each other, that is, an optical fiber cable will first passes through one of the optical fiber sensors, and then extends to the next adjacent optical fiber sensor. Besides, the optical fiber sensor located at the head of the structure is connected to an optical module, and the optical fiber sensor also shares one optical fiber cable with the optical module. The disadvantage of this kind of connection is that if there is something wrong with a part of the optical fiber cable segment of one of the optical fiber sensors, the connection of the adjacent optical fiber sensor or optical module needs to be adjusted during the process of replacing the optical fiber cable, which makes the operator has to move back and forth between the two optical fiber sensors (or the optical fiber sensor and the optical module). Therefore, the connecting structure of the conventional optical fiber sensors is way too complicated and difficult to repair, and the repairing process is also effort consuming.

SUMMARY OF THE INVENTION

An objective of the present invention is to provide an optical fiber sensing system which has a floating module with adjustable density. The fatigue of the optical fiber measuring module caused by long-term excessive tensile force may be effectively reduced to prolong the service time of the optical fiber cable of the optical fiber measuring module by adjusting the ratio of the overall density of the floating module to the fluid density being approximately 1.

Another objective of the present invention is to provide an optical fiber sensing system with a plurality of vibration absorbing structures. The optical fiber sensing system can effectively absorb the surrounding vibrational energy to reduce the damage to the optical fiber sensing system caused by the vibration.

Another objective of the present invention is to provide an optical fiber sensing system which simplifies the connection structure of the optical fiber cable disposed in the optical fiber sensing system, thereby saving efforts and time in the process of repairing and maintaining the optical fiber sensing system.

In order to achieve the above objectives, the present invention provides an optical fiber sensing system including an optical fiber measuring module, a floating module and a containing structure. The optical fiber measuring module has a first optical fiber extension segment and a first sensing segment, the first sensing segment is formed on the first optical fiber extension segment. The floating module provides tensile force on the first sensing segment, and has a central connector and a plurality of floating unit. The central connector is connected to a first end of the first optical fiber extension segment. The floating units contacts and surrounds the central connector, and each of the floating units has a vibration absorbing structure and a mass element. The containing structure has a container for accommodating a fluid. The fluid provides buoyant force to the floating module when the floating module is disposed into the fluid. When an input signal is transmitted to the first sensing segment, a first output signal is generated after the input signal is processed by the first sensing segment, and the tensile force applied to the first sensing segment changes and the first output signal fluctuates with variation of the buoyant force on the floating module.

Preferably, a ratio of a density of the floating module to a density of the fluid is substantially 1.

The vibration absorbing structure has at least one of an elastic body, a damping liquid and a porous body. In one embodiment of the present invention, the vibration absorbing structure has the elastic body and the damping liquid, the elastic body is sleeved on the mass element, and the mass element and the elastic body are partially immersed in the damping liquid.

In another embodiment of the present invention, the vibration absorbing structure has the porous body, and the mass element is disposed on the porous body.

The optical fiber measuring module has a second optical fiber extension segment and a second sensing segment, the second optical fiber extension segment is connected to the first optical fiber extension segment, and the second sensing segment is formed on the second optical fiber extension segment. When the input signal is transmitted to the second sensing segment, the second output signal is generated after the input signal is processed by the second sensing segment, and the first output signal and the second output signal are adapted to implement a comparison and an operation.

The containing structure further has a bearing platform extending along a horizontal plane and is disposed in the container. The bearing platform is spaced apart from a fluid surface of the fluid.

The containing structure further has a holder which has a wide section and a narrow section connecting with the wide section. The bearing platform has a board and a first positioning portion, the board has a first surface, and the first positioning portion is disposed on the first surface. The wide section of the holder is located on the first positioning portion of the bearing platform, the narrow section penetrates through the board, the wide section and the narrow section clamp a second end of the first optical fiber extension segment, and the first sensing segment is located between the first end and the second end of the first optical fiber extension segment.

The second optical fiber extension segment has a third end and a fourth end, the third end is connected to the second end, and the second sensing segment is located between the third end and the fourth end. The board has a second surface opposite to the first surface, the bearing platform has a second positioning portion, the second positioning portion is disposed on the second surface, the third end and the fourth end are fixed on two sides of the second positioning portion, and the second sensing segment is located under the second positioning portion.

The optical fiber sensing system of the present invention further includes a wiring hub and an optical module. The wiring hub is disposed on a wall of the container away from the fluid, and the second optical fiber extension segment is connected to the wiring hub.

The optical module is connected to the second optical fiber extension segment via the wiring hub, and the optical module is electrically connected to a signal processing module.

The first sensing segment is a tension and temperature sensing segment, and the second sensing segment is a temperature sensing segment implementing a temperature compensation for the first sensing segment.

The floating module further has a sleeve, and the central connector and the floating units are received in the sleeve.

The containing structure further has a plurality of energy dissipating elements, and each of the energy dissipating elements is disposed in the container and partially immersed in the damping liquid.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Figure 1:
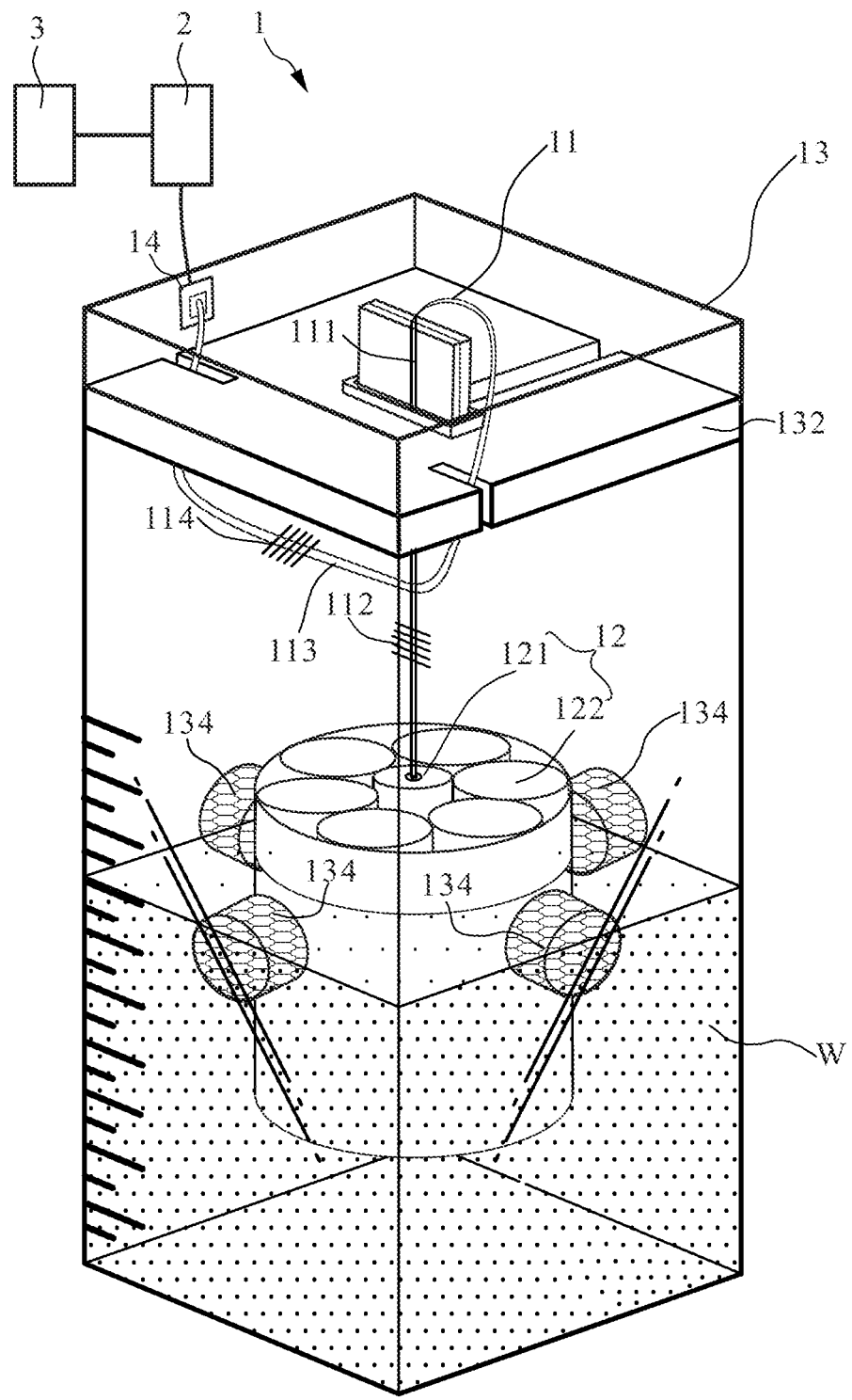
FIG. 1 is a three-dimensional schematic view of the optical fiber sensing system according to an embodiment the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
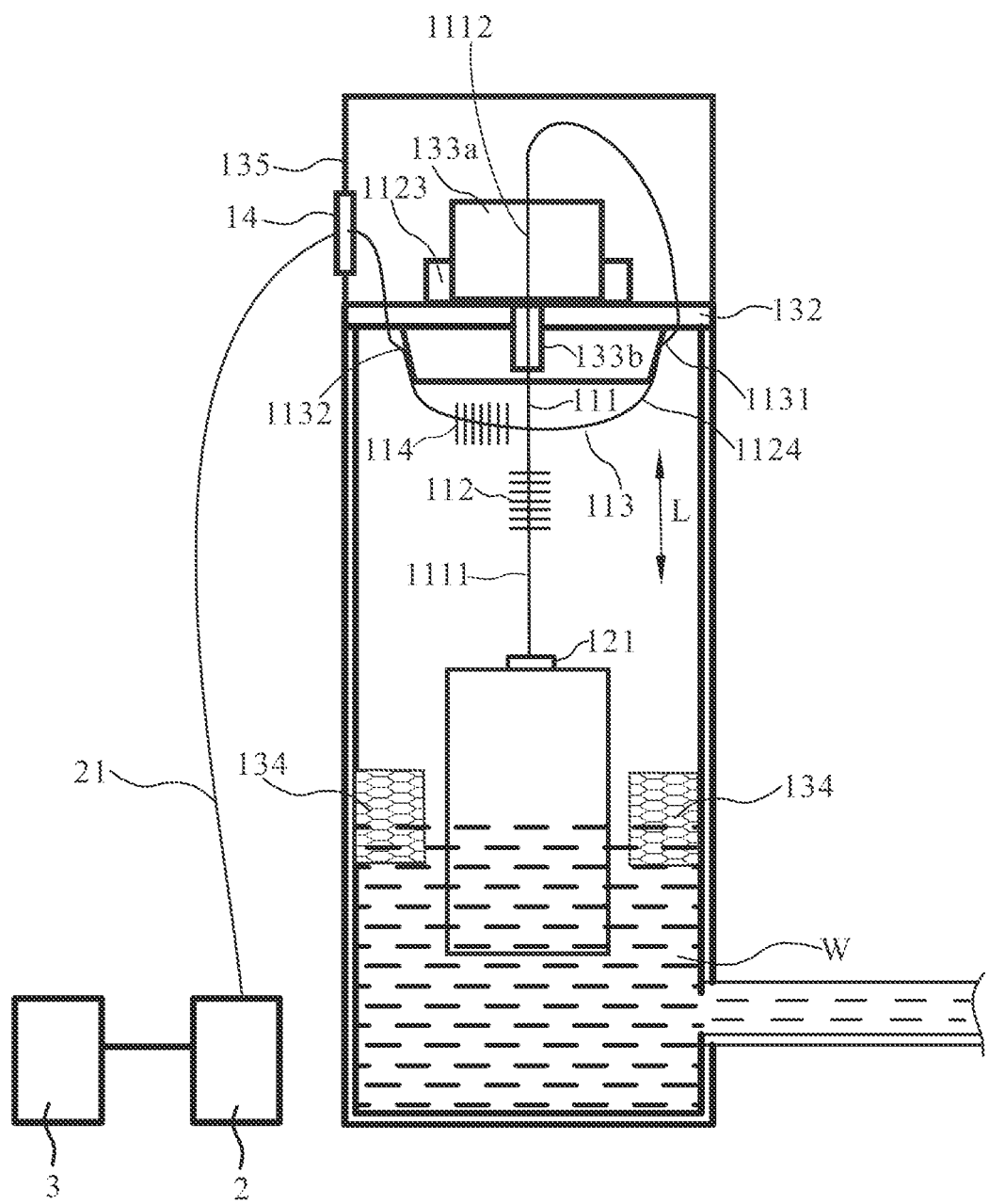
FIG. 2 is a side view of the optical fiber sensing system according to an embodiment of the present invention.

Reference is made to FIG. 1 and FIG. 2 which are a three-dimensional schematic view and a side view of an embodiment of an optical fiber sensing system 1 according to the present invention. The optical fiber sensing system 1 of this embodiment includes an optical fiber measuring module 11, a floating module 12, a containing structure 13, and a wiring hub 14. The optical fiber measuring module 11 is connected between the floating module 12 and the wiring hub 14, the optical fiber measuring module 11 and the floating module 12 are arranged in the containing structure 13, and the wiring hub 14 is formed on the containing structure 13. The optical fiber sensing system 1 may be further electrically connected to an optical module 2 and a signal processing module 3. The optical module 2 and the signal processing module 3 are arranged outside the containing structure 13, the optical module 2 is connected to the wiring hub 14 and is used for inputting signals to the optical fiber measuring module 11 or receiving the signals output by the optical fiber measuring module 11, and the signal processing module 3 further processes the signals output by the optical module 2. The detailed structure and connection relationship of each element will be described in detail below.

Figure 3:
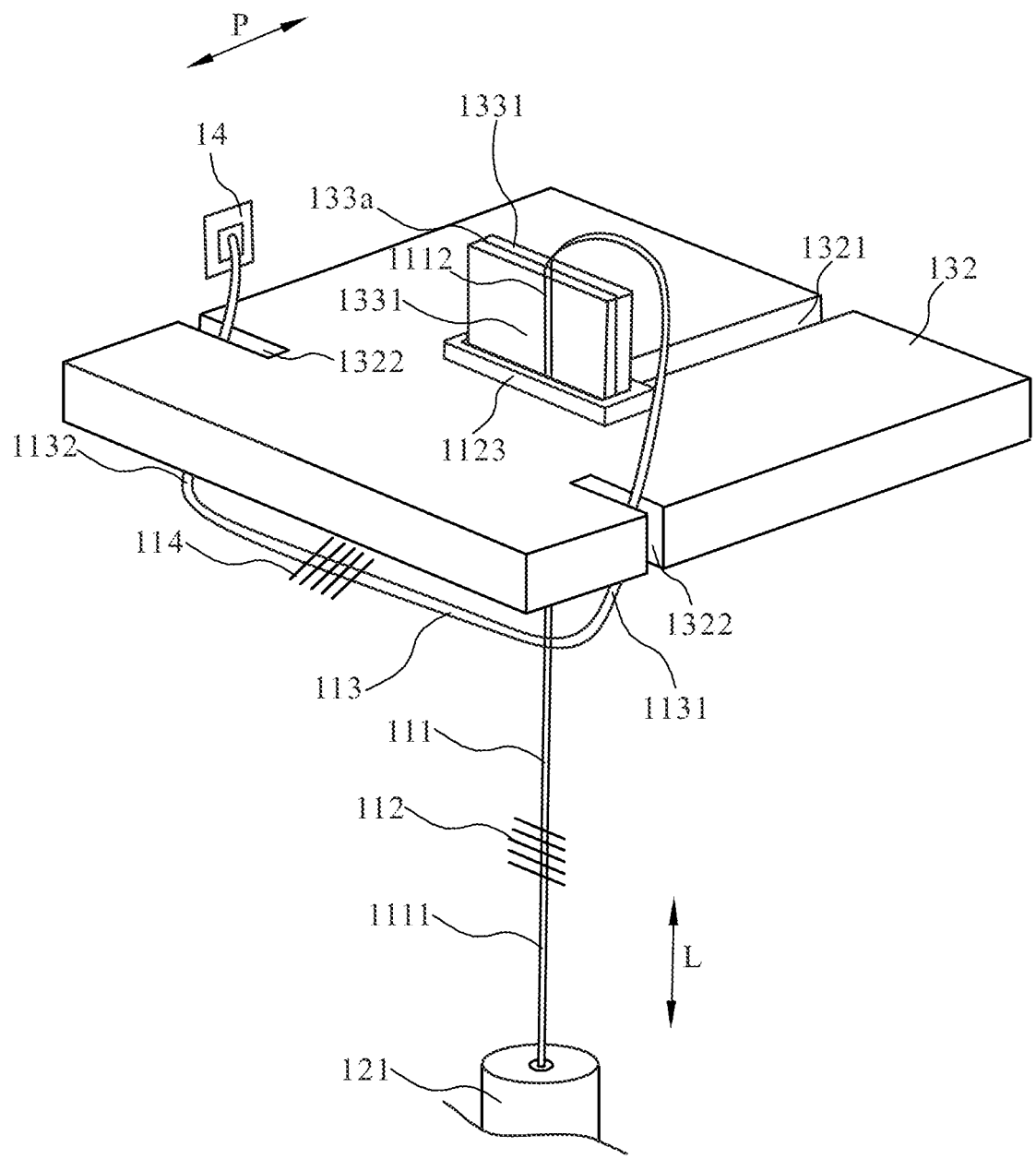
FIG. 3 is a partial schematic view of the optical fiber measuring module and the containing structure of the optical fiber sensing system according to an embodiment of the present invention.
Figure 4:
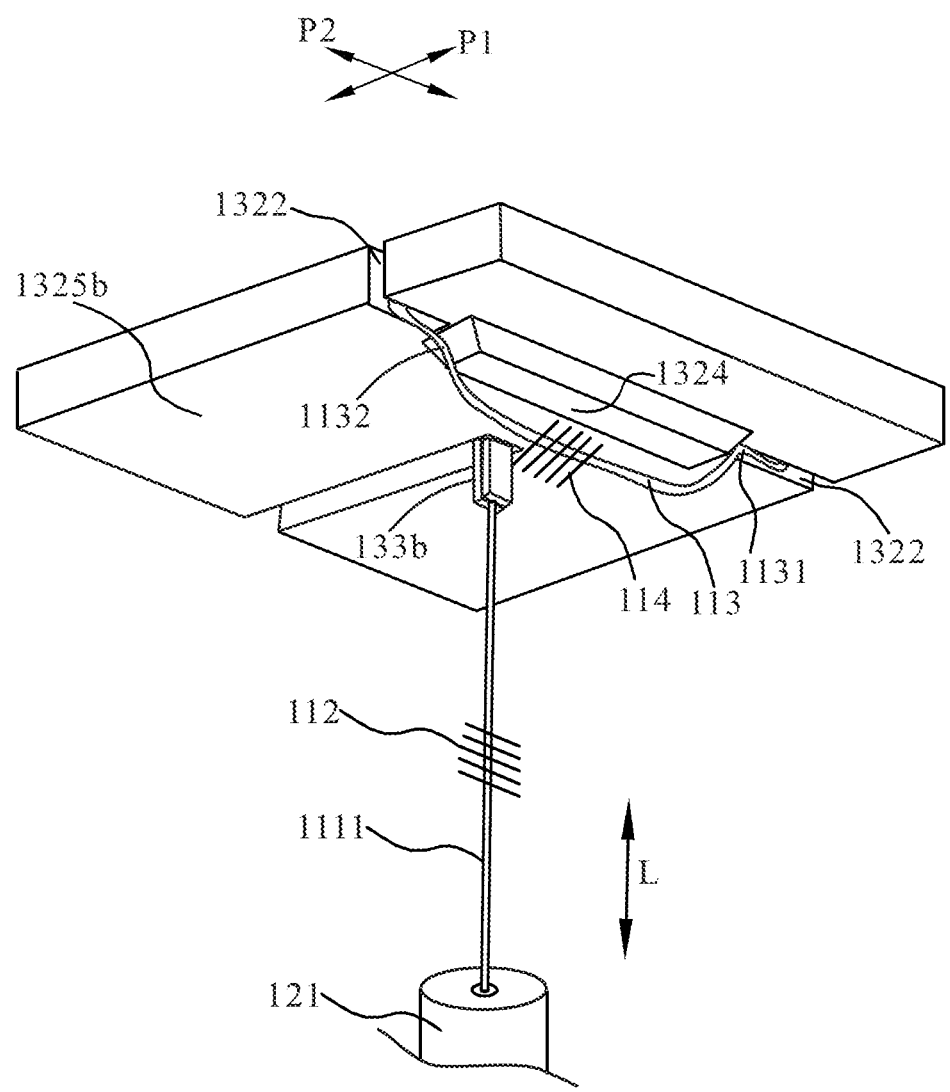
FIG. 4 is a another partial schematic view of the optical fiber measuring module and the containing structure of the optical fiber sensing system according to an embodiment of the present invention.

Referring to FIG. 3 and FIG. 4, the optical fiber measuring module 11 has a first optical fiber extension segment 111, a first sensing segment 112, a second optical fiber extension segment 113, and a second sensing segment 114. In this embodiment, the first sensing segment 112 has a plurality of optical gratings used as a tension and temperature sensing section. Besides, the second sensing section 114 also has a plurality of optical gratings used as a temperature sensing segment. The first optical fiber extension segment 111 has a first end 1111 and a second end 1112. The first sensing segment 112 is formed on the first optical fiber extension segment 111 and located between the first end 1111 and the second end 1112. The second optical fiber extension segment 113 has a third end 1131 and a fourth end 1132. The second sensing segment 114 is formed on the second optical fiber extension segment 113 and located between the third end 1131 and the fourth end 1132. The second end 1112 of the first optical fiber extension segment 111 is connected to the third end 1131 of the second optical fiber extension segment 113.

Figure 5:
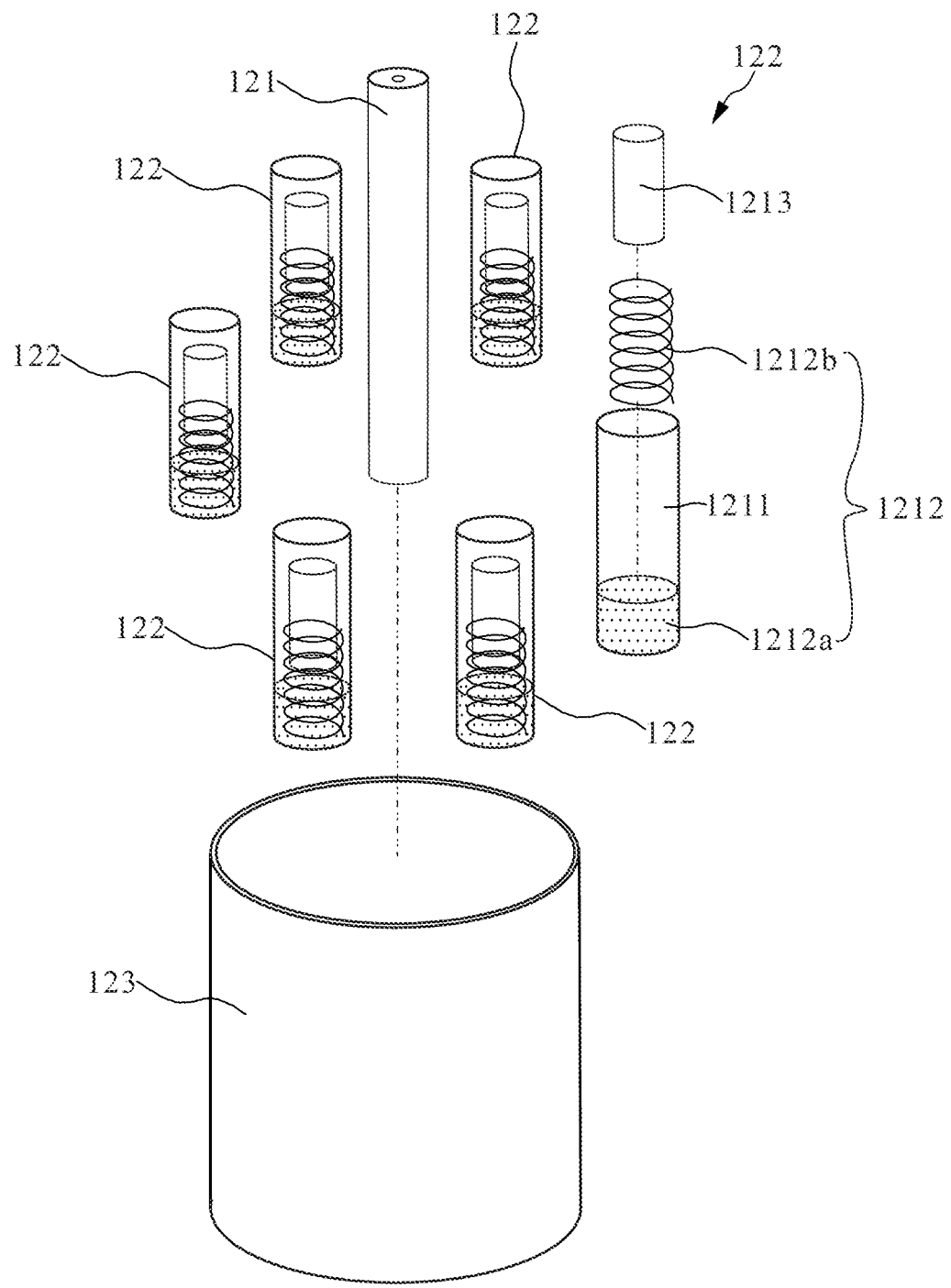
FIG. 5 is an exploded schematic view of the floating module of the optical fiber sensing system according to an embodiment of the present invention.

Referring to FIG. 5, the floating module 12 has a central connector 121, a plurality of floating units 122, and a sleeve 123. The central connector 121 and the floating units 122 are received in the sleeve 123. The central connector 121 is located at the center of the sleeve 123. The floating units 122 contact and surround the central connector 121. Each of the floating units 122 has a hollow tube 1211, a vibration absorbing structure 1212, and a mass element 1213. The vibration absorbing structure 1212 has damping fluid 1212*a* and an elastic body 1212*b*. In this embodiment, the elastic body 1212*b* is a spring, and the mass element 1213 is a lead block. The damping liquid 1212*a*, the elastic body 1212*b* and the mass element 1213 are all disposed in the hollow tube 1211. The mass element 1213 is sleeved in the elastic body 1212*b*, and is placed in the damping liquid 1212*a*. The mass element 1213 is kept at a distance from a bottom of the hollow tube 1211, therefore, the mass element 1213 can be prevented from directly hitting the hollow tube 1211 when receiving the vibration from outside, and the external vibration energy can be effectively absorbed via the damping liquid 1212*a* and the elastic body 1212*b*. As shown in FIG. 2, the connection between the floating module 12 and the optical fiber measuring module 11 is to connect the first end 1111 of the first optical fiber extension segment 111 via the central connector 121, so the floating module 12 provides the first sensing segment 112 with tensile force, and a ratio of a density of the floating module 12 to a density of the fluid W may be adjusted by the mass element 1213 to be close to 1. Thus, the floating module 12 may not provide the first sensing segment 112 with excessive tensile force for a long time.

Figure 6:
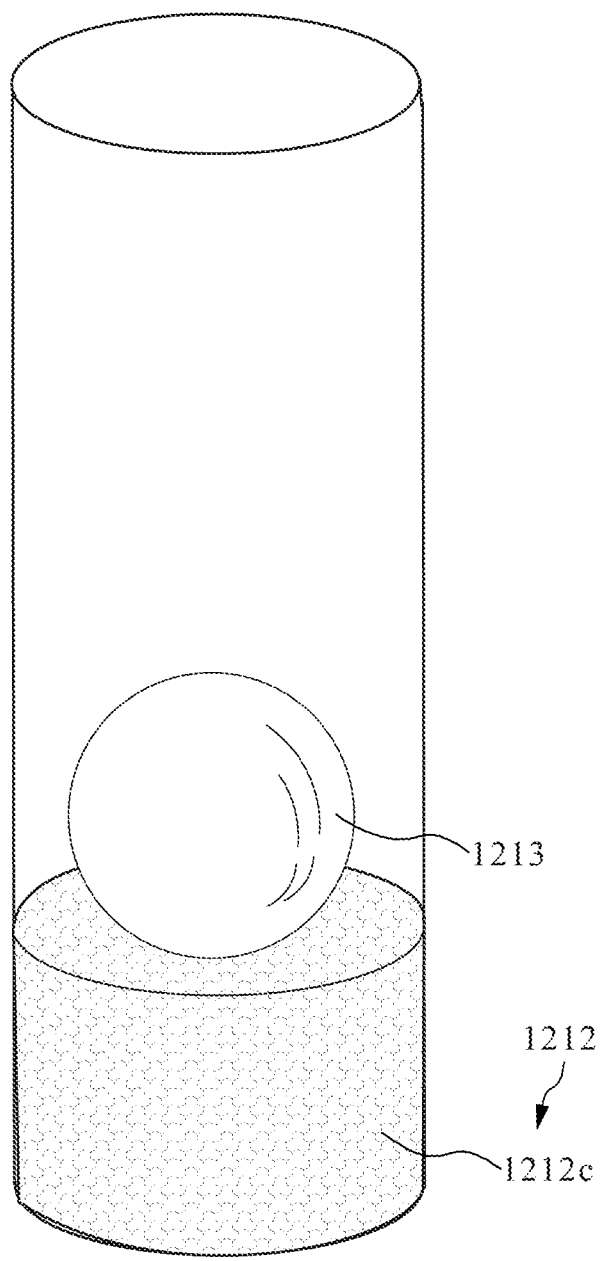
FIG. 6 is a three-dimensional schematic view of the floating units of the optical fiber sensing system according to another embodiment of the present invention.

It shall be noted that, in another embodiment of the present invention, as shown in FIG. 6, the vibration absorbing structure 1212 of the floating unit 122 has a porous body 1212*c* (such as foam cotton), and the mass element 1213 is disposed on the porous body 1213*c*. The porous body 1213*c* also has the effect of absorbing vibration energy. In other embodiments of the present invention, the vibration absorbing structure 1212 can also select other elements capable of absorbing vibration energy, and is not limited to the elements in the above-mentioned embodiments. Besides, the shape and quantity of the mass element 1213 can also be adjusted based on requirements.

Figure 7:
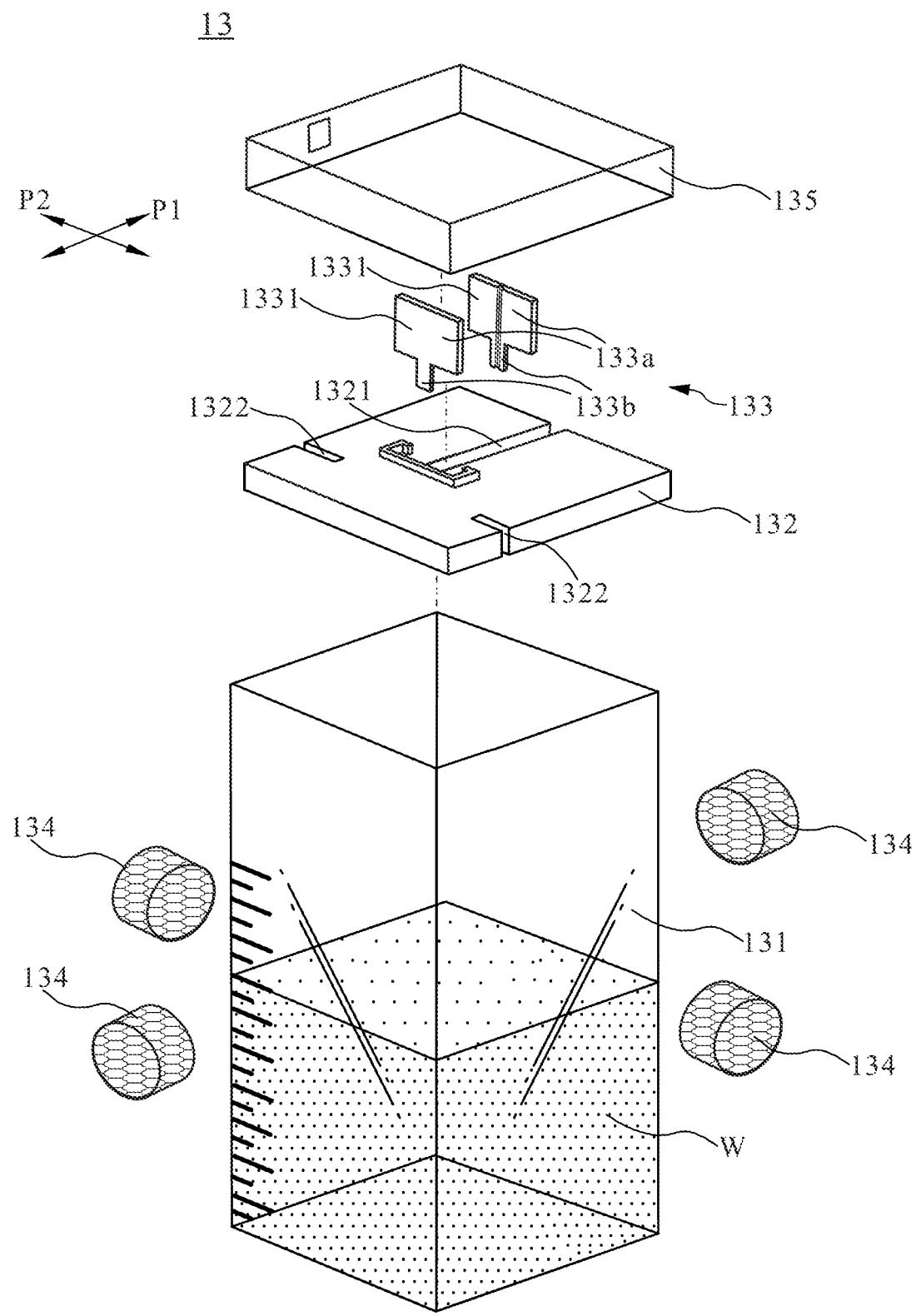
FIG. 7 is an exploded schematic view of the containing structure of the optical fiber sensing system according to an embodiment of the present invention.
Figure 8:
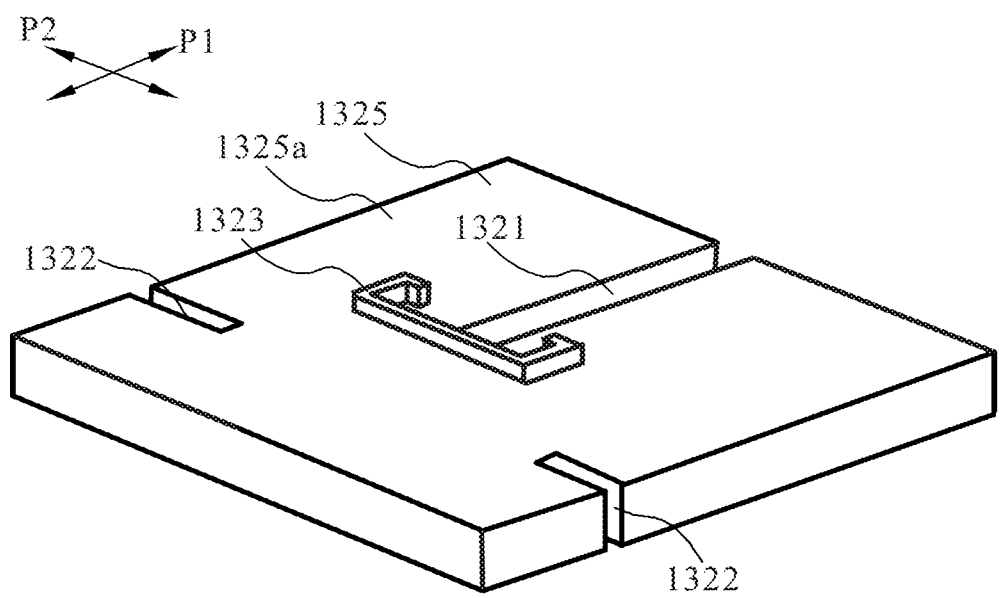
FIG. 8 and FIG. 9 are three-dimensional schematic views, from different angles, of the bearing platform of the optical fiber sensing system according to an embodiment of the present invention.
Figure 9:
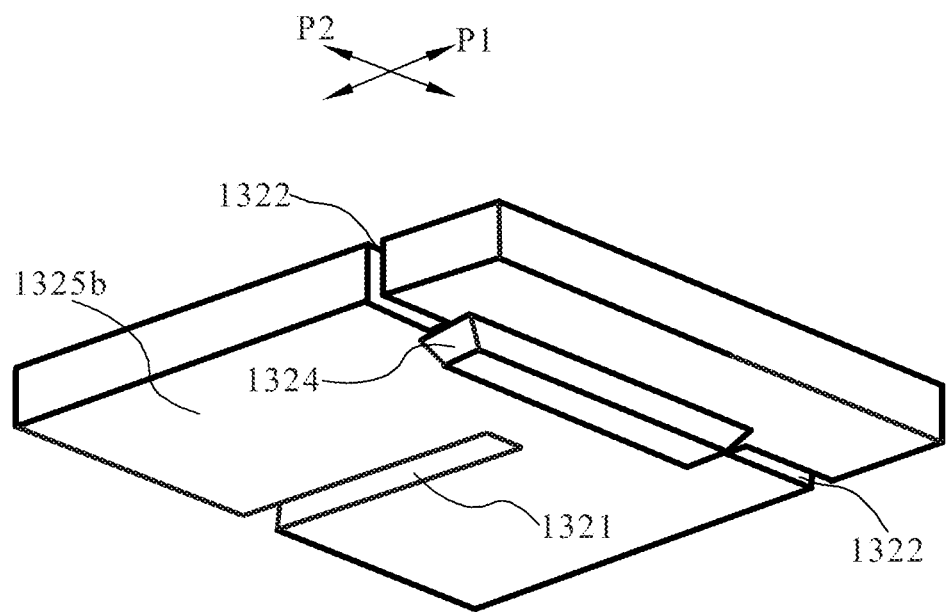

Referring to FIGS. 7, 8 and 9, the containing structure 13 has a container 131, a bearing platform 132, a holder 133, a plurality of energy dissipating elements 134 and a cover body 135. The container 131 is suitable for accommodating fluid W, and one of the walls of the container 131 is drawn with plural scales for indicating the relative level of the fluid W in the containing structure 131. The floating module 12 is placed into the fluid W, and the fluid W provides buoyant force to the floating module 12. The bearing platform 132 has a slot 1321, two grooves 1322, a first positioning portion 1323, a second positioning portion 1324 and a board 1325. The board 1325 has a first surface 1325*a* and a second surface 1325*b* opposite to the first surface 1325*a*. The slot 1321 is formed on the board 1325 and extends along a first horizontal direction P1, the grooves 1322 extend along a second horizontal direction P2 (the first horizontal direction P1 is perpendicular to the second horizontal direction P2), and formed on the board 1325. The grooves 1322 are opposite to each other. The first positioning portion 1323 is disposed on the first surface 1325*a* of the board 1325 and is located at one end of the slot 1321, and the second positioning portion 1324 is disposed on the second surface 1325*b* of the board 1325 and is located between the grooves 1322. The bearing platform 132 is disposed in the container 131 and is spaced apart from a fluid surface of the fluid W at a distance, and the second surface 1325*b* faces the fluid W.

The holder 133 has two plates 1331, and the holder 133 has a wide section 133*a* and a narrow section 133*b* which means that the holder 133 is approximately T-shaped, as shown in FIG. 2, FIG. 3 and FIG. 4. The plates 1331 collaboratively hold the second end 1112. In this embodiment, one of the plates 1331 has a channel for accommodating the second end 1112, so the second end 1112 penetrates through the channel of one of the plates 1331 (as shown in FIG. 7) to make the second end 1112 of first optical fiber extension segment 111 passes through the narrow section 133*b* and the wide section 133*a*. The narrow section 133*b* is embedded in the slot 1321, and the wide section 133*a* can be disposed on the first positioning portion 1323 of the bearing platform 132. Therefore, the second end 1112 of the first optical fiber extension segment 111 can be effectively positioned without shaking, and reducing the probability of pulling the first optical fiber extension segment 111 due to shaking. Thus, the second end 1112 of the first optical fiber extension segment 111 can be fixed to the containing structure 13 by the bearing platform 132 and the holder 133. If the optical fiber sensing system 1 needs maintenance or repair, the narrow section 133*b* of the holder 133 may be quickly separated from the bearing platform 132 by the slot 1321. In other words, the bearing platform 132 and the holder 133 of the present invention may not only fix the optical fiber measuring module 11, but also maintain or replace the optical fiber measuring module 11 effectively and quickly.

In addition, in this embodiment, the energy dissipating elements 134 are attached to the wall of the container 131 with intervals, and each of the energy dissipating elements 134 is partially immersing in the fluid W and partially protruding from the fluid W, thereby, the energy dissipating elements 134 can absorb the fluctuations when the fluid W is receiving the vibration from the outside to reduce the influence of the external vibration on the fluid W. In addition, the material of the energy dissipating element 134 may include a porous vibration absorbing material such as foam cotton. When the floating module 12 is shaken due to earthquake or transportation, the energy dissipating element 134 will preferentially contact the floating module 12 and absorb the vibration energy caused by the collision, thereby effectively preventing the sleeve 123 from being directly impacted.

Referring to FIG. 2, FIG. 3 and FIG. 4, the connection relationship between the second optical fiber segment 113, the bearing platform 132, and the wiring hub 14 will be described below. The second end 1112 of the first optical fiber segment 1111 is firstly connected to the third end 1131 of the second optical fiber segment 113, then the third end 1131 passes through one of the grooves 1322 from the top of the bearing platform 132 and extends to the bottom of the bearing platform 132. The third end 1131 and the fourth end 1132 are partially fixed on two sides of the second positioning portion 1324 respectively, and the fourth end 1132 passes through another groove 1322 from the bottom of the bearing platform 132 to the top of the bearing platform 132. Since the second optical fiber extension segment 113 and the second positioning portion 1324 are partially fixed, the second sensing segment 114 is located between the third end 1131 and the fourth end 1132, and almost parallel to the bearing platform 132 (in this embodiment, it is located under the second positioning portion 1324), and the floating module 12 will not provide any tensile force to the second sensing segment 114. Therefore, the grating pitch of the optical grating of the second sensing segment 114 only changes because of the ambient temperature. Thus, the ambient temperature in which the optical fiber sensing system 1 is located can be first known, and the influences of the ambient temperature on the second sensing segment 114 can be further known.

As mentioned above, the wiring hub 14 is disposed on a wall of the cover body 135 and away from the fluid W. In this embodiment, the end segment of the fourth end 1132 is configured with a connector to connect to the wiring hub 14, and the cable 21 of the optical module 2 is also connected to the wiring hub 14 so as to connect to the second optical fiber extension segment 113 via the wiring hub 14. In addition, the optical module 2 is electrically connected to the signal processing module 3. The advantage of configuring the wiring hub 14 is to quickly separate the second optical fiber extension segment 113 and the wiring hub 14 in situ for maintenance or replacement.

To further illustrate the optical fiber sensing method of the optical fiber sensing system 1, please refer to FIG. 2 again. When the floating module 12 of the optical fiber sensing system 1 is placed into the fluid W, the fluid W provides the buoyant force to the floating module 12, and the floating module 12 provides tensile force to the first sensing segment 112 to deform the first sensing segment 112 along a length direction L (the length direction L is perpendicular to the first horizontal direction P1 and the second horizontal direction P2). In order to sense the deformation of the first sensing segment 112 in the length direction L, the optical gratings are formed on the first sensing segment 112 in this embodiment. When the buoyant force provided by the fluid W to the floating module 12 changes, the tensile force on the first sensing segment 112 will also change accordingly, which leads to the change of the grating pitch of the gratings, and the wavelength of the optical signal will be shifted. Therefore, by monitoring the change of the wavelength of the output signal, the deformation state of the first sensing segment 112 can be known.

Figure 10:
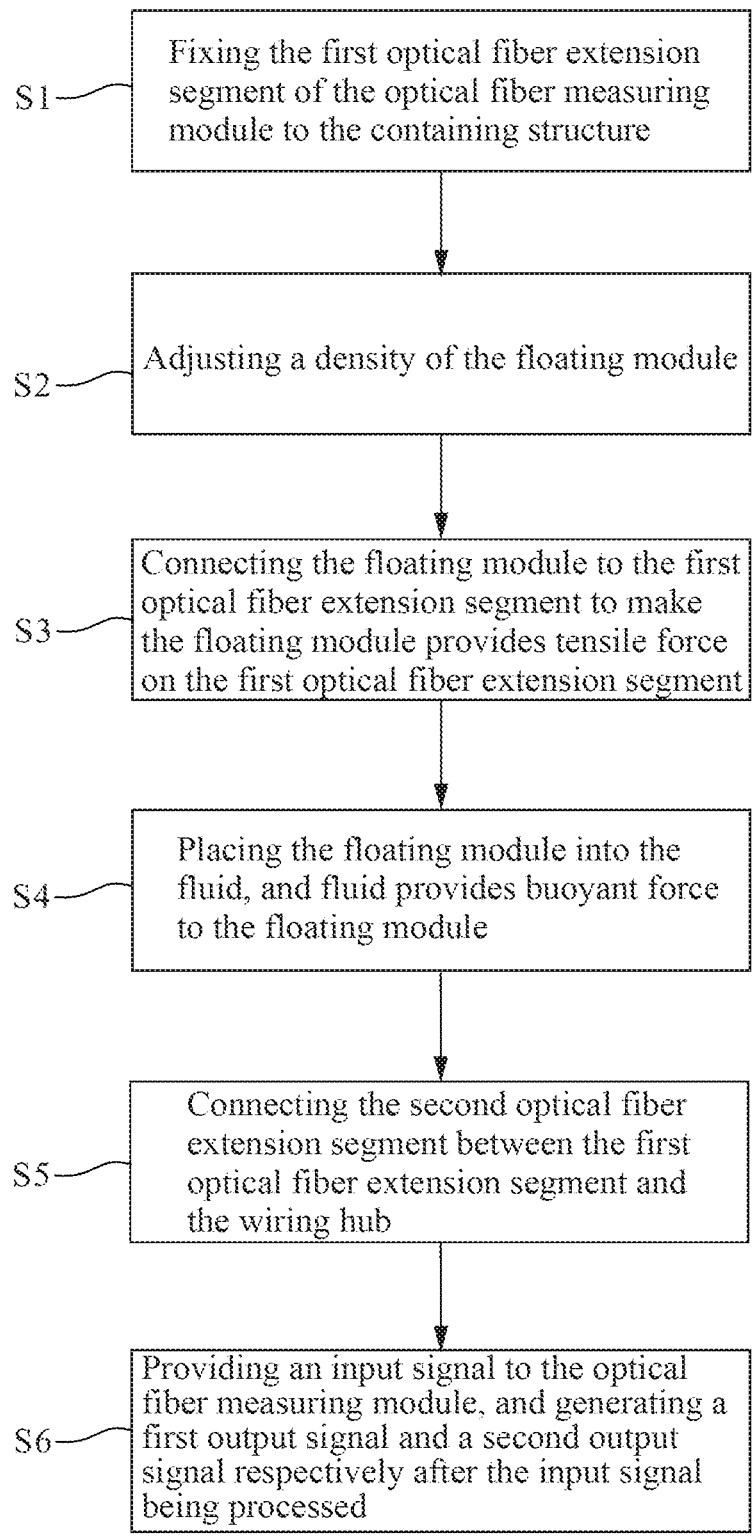
FIG. 10 is a flow chart of the optical fiber sensing method according to the present invention.

According to the structure of the above-mentioned optical fiber sensing system 1, the present invention further provides an optical fiber sensing method, and the flowchart of the method is shown in FIG. 10. The optical fiber sensing method may obtain that the structure could have changed according to the tensile force on the first sensing segment 112 and change of the ambient temperature, and obtain the influence of the ambient temperature on the change of the wavelength of light according to the second sensing segment 114. Please refer to the optical fiber sensing system 1 as shown in FIG. 1 to FIG. 6 for the description of the following steps.

Step S1: fixing the first optical fiber extension segment 111 of the optical fiber measuring module 11 to the containing structure 13. That is, the first optical fiber extension segment 111 is clamped by the holder 133 first, and then the holder 133 is fixed on the bearing platform 132.

Step S2: adjusting a density of the floating module 12. The floating module 12 has a plurality of floating units 122, and the vibration absorbing structure 1212 and the mass element 1213 are arranged in the sleeve 123 of each of the floating units 122. The ratio of a density of the floating module 12 to a density of the fluid W is close to 1 by configuring the quantity or size of the mass element 1213, and the floating units 122 surround the central connector 121. Meanwhile, the vibration absorbing structure 1212 can effectively absorb the external vibration energy.

Step S3: connecting the floating module 12 to the first optical fiber extension segment 111 to make the floating module 12 provides tensile force on the first optical fiber extension segment 111. Specifically, the central connector 121 is connected to the first optical fiber extension segment 111, and the first sensing segment 112 is formed on the first optical fiber extension segment 111, so that the floating module 12 provides the tensile force on the first sensing segment 112.

Step S4: placing the floating module 12 into the fluid W, and fluid W provides buoyant force to the floating module 12. In detail, the fluid W is accommodated in the container 131 of the containing structure 13, and the floating module 12 is placed into the fluid W.

Step S5: connecting the second optical fiber extension segment 113 between the first optical fiber extension segment 111 and the wiring hub 14. In detail, the second sensing segment 114 is formed on the second optical fiber extension segment 113, and the second optical fiber extension segment 113 is nearly parallel to the first horizontal direction P1, so the grating pitch of the optical grating of the second sensing segment 114 is only affected when the temperature changes without being affected by tensile force. When the buoyant force provided by the fluid W changes, the change of the tensile force on the first sensing segment 112 and the ambient temperature will lead the grating pitch of the optical grating of the first sensing segment 112 to be lengthened or shortened. In other words, there are two factors affecting the grating pitch of the first sensing segment 112, and the two factors are the tensile force provided by the floating module 12 and the ambient temperature. Therefore, by comparing the difference between the grating pitch changes of the first sensing segment 112 and the second sensing segment 114, it is possible to know the influence of the ambient temperature on the change of the grating pitch in advance, and further implement the temperature compensation for the first sensing segment 112 as well as calculate the effect of the actual tensile force on the grating pitch.

Step S6: providing an input signal to the optical fiber measuring module 11, and generating a first output signal and a second output signal respectively after the input signal being processed. Specifically, the optical module 2 is coupled to the optical fiber measuring module 11, and the optical module 2 is further coupled to the signal processing module 3. The optical module 2 transmits an input signal into the first optical fiber extension segment 111 and the second optical fiber extension segment 113, and a first output signal and a second output signal are generated and sent to the optical module 2 after the input signal is processed by the first sensing segment 112 and the second sensing segment 114 respectively. The first output signal and the second output signal are compared and analyzed by the signal processing module 3 to obtain the state of a section to be measured 51 of a structure 5 and ambient temperature and other related physical parameters. In this way, when the interval of the grating pitches of the optical grating of the first sensing segment 112 changes, it can be known the change is caused by the ambient temperature or the tensile force. If the change is caused by the tensile force, the state of each segment to be measured 51 of the structure 5 can be obtained.

Figure 11:
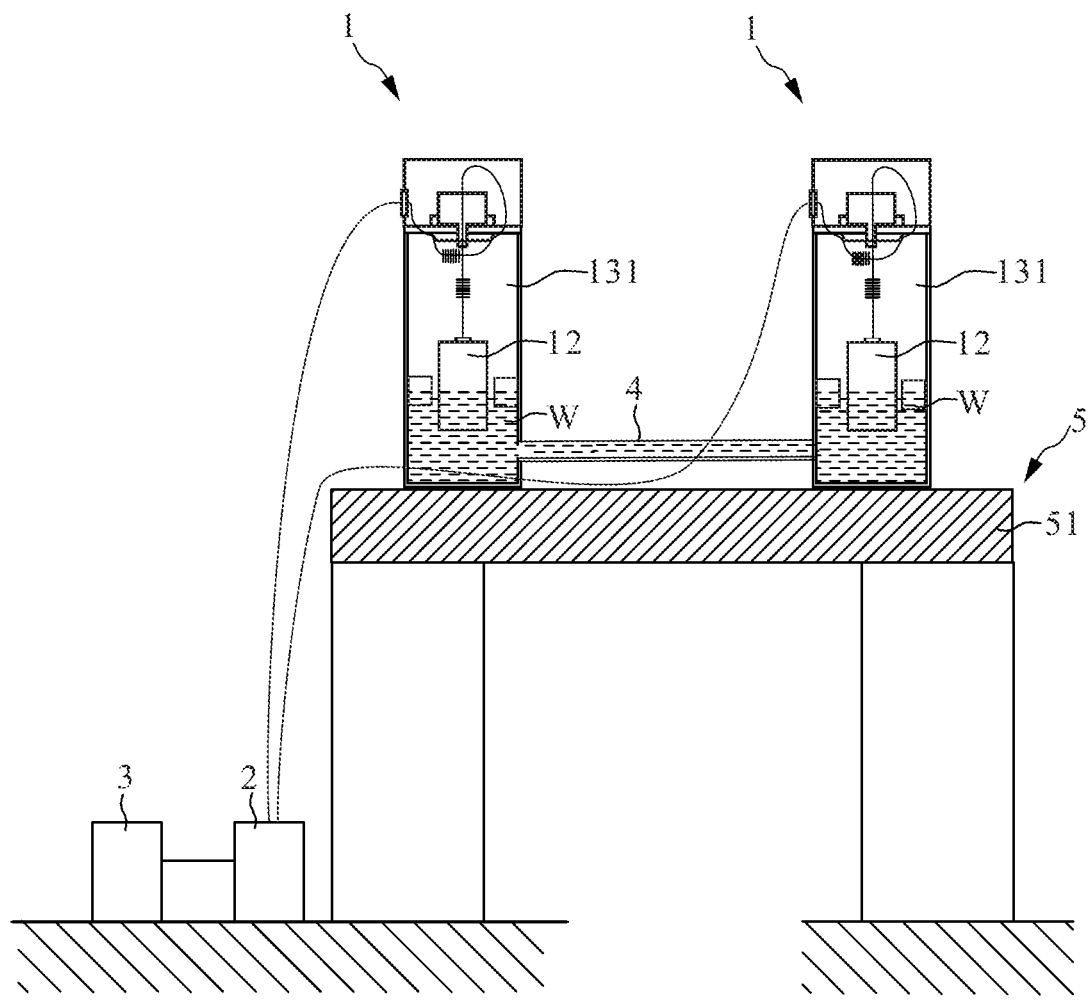
FIG. 11 is a schematic view illustrating that a plurality of optical fiber sensing devices of the present invention are installed on the object to be tested in the structure.

For example, the above-mentioned optical fiber sensing method can be applied to monitor whether each segment to be measured 51 of the structure 5 such as bridges, buildings, roads, etc. is inclination or subsidence. Reference is made to FIG. 11 which is a schematic view of the state where two optical fiber sensing systems 1 are set on one of the segment to be measured 51 of the structural 5. The fluid W of each optical fiber sensing system 1 flows through each other via a communicating vessel 4, the liquid level of the fluid W of each optical fiber sensing system 1 are kept at the same level according to the principle of the communicating vessel, and the fluid W inside each container 131 provides buoyant force to the corresponding floating module 12 respectively.

Figure 12:
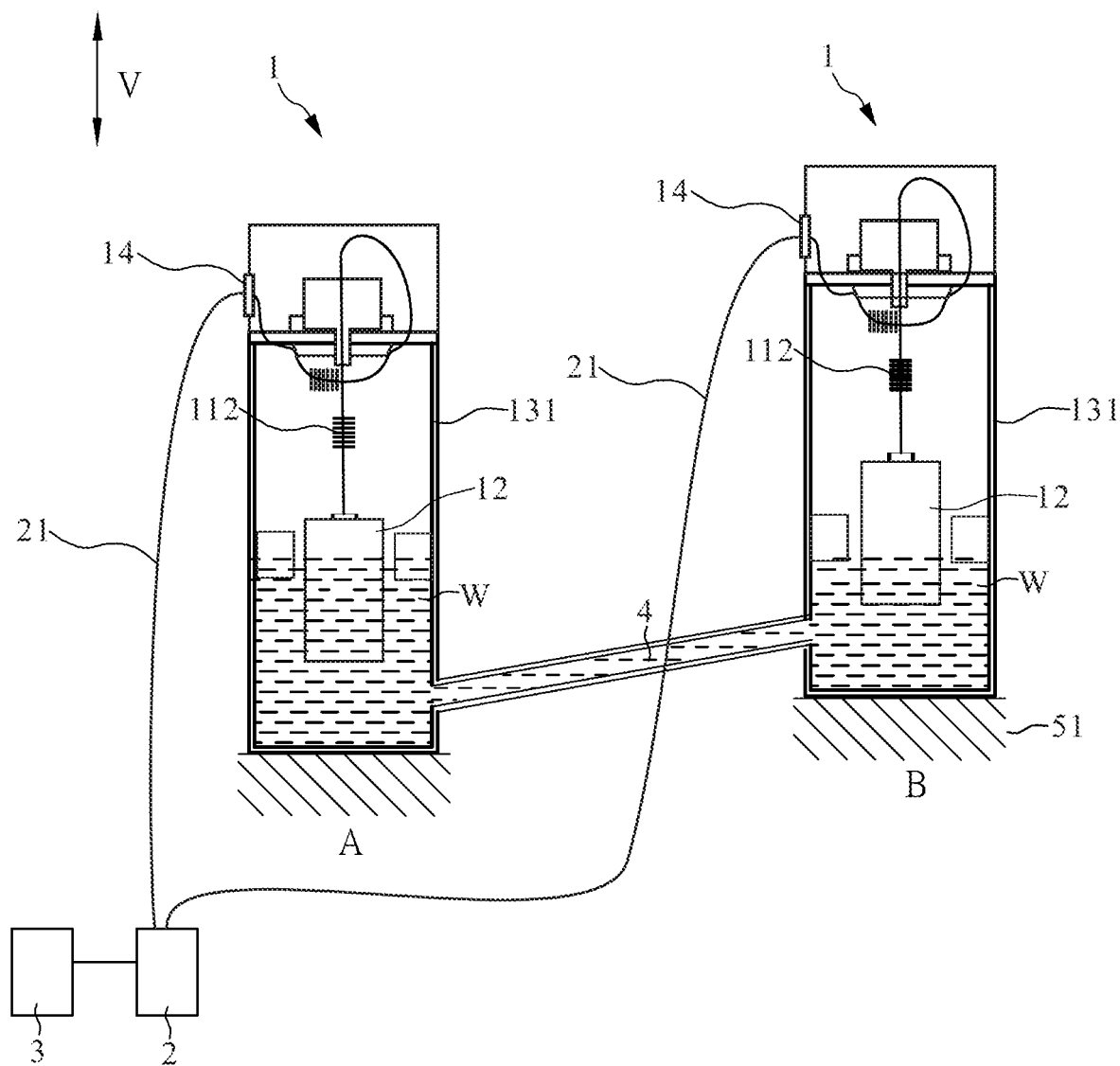
FIG. 12 is a schematic view of a plurality of optical fiber sensing devices of the present invention in a subsidence state.

Accordingly, referring to FIG. 12, the mechanism of the relative displacement of the two containing structures 13 in the vertical direction V is further described. When the left area A of the segment to be measured 51 of the structure 5 sinks (or the segment to be measured 51 is inclined to the left) and the height difference of the two optical fiber sensing system 1 changes, according to the principle of the communicating vessel, the fluid W inside the container 131 on the right area B will flow to the container 131 on the left area A via the communicating vessel 4 so as to maintain the liquid level of the fluid W in the two containing structures 13 at the same level. Then, the liquid level of the fluid W in the container 131 on the left area A will rise, the buoyancy force on the corresponding floating module 12 will increase, and the tensile force on the corresponding first sensing segment 112 will become smaller accordingly. On the contrary, the buoyant force on the floating module 12 in the container 131 in the right area B decreases because the liquid level W drops which causes the tensile force on the corresponding first sensing segment 112 become greater. Accordingly, the subsidence or inclination of the segment to be measured 51 will cause the interval of the grating pitches of the two first sensing segments 112 to change, thereby the reflected light signal (i.e., the output signal) received by the optical module 2 also changes. Since the measured output signal is related to subsidence or inclination between the two optical fiber sensing systems 1 after excluding the influence of the ambient temperature, the signal processing module 3 can convert the output signal into physical parameters (such as the inclination angle or the subsidence depth) related to the subsidence or inclination to know the subsidence or inclination of the surface of the segment to be measured 51. In addition, as shown in FIG. 1 and FIG. 7, since the container 131 is marked with scales, the maintenance personnel can also quickly judge whether the liquid level of the fluid W has changed significantly through the scale to double check the surface subsidence or inclination of the segment to be measured 51.

In practical applications, the number of optical fiber sensing systems 1 is not limited to the number shown in this embodiment, and the required number of optical fiber sensing systems 1 can be determined according to the length of the structure 5, and each optical fiber sensing system 1 are connected via the communicating vessel 4 so that the fluid W can flow to other optical fiber sensing system 1 through the communicating vessel 4.

According to the above, in the present invention, the overall density can be adjusted by the configuration of the mass element 1213 of the floating unit 122 of the floating module 12 to reduce the excessive tensile force on the optical fiber, and to prolong the service time of the optical fiber. The vibration absorbing structure 1212 of the floating unit 122 and the energy dissipating element 134 of the containing structure 13 are used for absorbing the external vibration energy. In addition, the influence of the ambient temperature on the optical grating can be further obtained from the second sensing segment 114, to clearly understand the actual state of the structure 5. Each optical fiber sensing system 1 is independently coupled to the optical module 2 via the wiring hub 14 to simplify the connection between the optical fiber sensing systems 1 and make maintenance and repairs faster.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical fiber sensing system, comprising:
   an optical fiber measuring module having a first optical fiber extension segment and a first sensing segment, the first sensing segment being formed on the first optical fiber extension segment;
   a floating module providing tensile force on the first sensing segment, and having:
   a central connector being connected to a first end of the first optical fiber extension segment; and
   a plurality of floating units contacting and surrounding the central connector, wherein each of the floating units has a vibration absorbing structure and a mass element, and the vibration absorbing structure has at least one of an elastic body, a damping liquid, and a porous body; and
   a containing structure having a container for accommodating a fluid, wherein the fluid provides buoyant force to the floating module when the floating module is disposed into the fluid;
   wherein the vibration absorbing structure has the elastic body and the damping liquid, the elastic body is sleeved on the mass element, and the mass element and the elastic body are partially immersed in the damping liquid, and when an input signal is transmitted to the first sensing segment, a first output signal is generated after the input signal is processed by the first sensing segment, and the tensile force applied to the first sensing segment changes and the first output signal fluctuates accordingly with variation of the buoyant force on the floating module, and wherein a ratio of a density of the floating module to a density of the fluid is approximately 1.

2. The optical fiber sensing system of claim 1, wherein the vibration absorbing structure has the porous body, and the mass element is disposed on the porous body.

3. The optical fiber sensing system of claim 1, wherein the optical fiber measuring module has a second optical fiber extension segment and a second sensing segment, the second optical fiber extension segment is connected to the first optical fiber extension segment, the second sensing segment is formed on the second optical fiber extension segment, and wherein when the input signal is transmitted to the second sensing segment, a second output signal is generated after the input signal is processed by the second sensing segment, and the first output signal and the second output signal are adapted to implement a comparison and an operation.

4. The optical fiber sensing system of claim 3, wherein the containing structure further has a bearing platform extending along a horizontal plane and being disposed in the container, and wherein the bearing platform is spaced apart from a fluid surface of the fluid.

5. The optical fiber sensing system of claim 4, wherein the containing structure further has a holder, the holder has a wide section and a narrow section connecting with the wide section, the bearing platform has a board and a first positioning portion, the board has a first surface, the first positioning portion is disposed on the first surface, the wide section of the holder is located on the first positioning portion of the bearing platform, the narrow section penetrates through the board, the wide section and the narrow section clamp a second end of the first optical fiber extension segment, and the first sensing segment is located between the first end and the second end of the first optical fiber extension segment.

6. The optical fiber sensing system of claim 5, wherein the second optical fiber extension segment has a third end and a fourth end, the third end is connected to the second end, the second sensing segment is located between the third end and the fourth end, the board has a second surface opposite to the first surface, the bearing platform has a second positioning portion, the second positioning portion is disposed on the second surface, the third end and the fourth end are fixed on two sides of the second positioning portion, and the second sensing segment is located under the second positioning portion.

7. The optical fiber sensing system of claim 6, further comprising a wiring hub and an optical module, wherein the wiring hub is disposed on a wall of the container away from the fluid, and the second optical fiber extension segment is connected to the wiring hub.

8. The optical fiber sensing system of claim 7, wherein the optical module is connected to the second optical fiber extension segment via the wiring hub, and the optical module is electrically connected to a signal processing module.

9. The optical fiber sensing system of claim 3, wherein the first sensing segment is a tension and temperature sensing segment, and the second sensing segment is a temperature sensing segment implementing a temperature compensation for the first sensing segment.

10. The optical fiber sensing system of claim 1, wherein the floating module further has a sleeve, and the central connector and the floating units are received in the sleeve.

11. The optical fiber sensing system of claim 1, wherein the containing structure further has a plurality of energy dissipating elements, and each of the energy dissipating elements is disposed in the container and partially immersed in the damping liquid.

* * * * *